(12) United States Patent
Li et al.

(10) Patent No.: US 10,679,760 B2
(45) Date of Patent: Jun. 9, 2020

(54) NUCLEAR INSTRUMENTATION SYSTEM AND METHOD FOR LOCATING THE SAME

(71) Applicants: CHINA NUCLEAR POWER ENGINEERING COMPANY LTD., Shenzhen, Guangdong (CN); CHINA GENERAL NUCLEAR POWER CORPORATION, Shenzhen, Guangdong (CN)

(72) Inventors: Tianyou Li, Guangdong (CN); Li Zeng, Guangdong (CN); Rui Zhang, Guangdong (CN); Hao Yang, Guangdong (CN); Xing Wang, Guangdong (CN); Yajie Tian, Guangdong (CN); Ji Shi, Guangdong (CN); Wei Wang, Guangdong (CN); Huaqing Peng, Guangdong (CN); Weihua Chen, Guangdong (CN); Weijun Huang, Guangdong (CN); Hui Jiang, Guangdong (CN)

(73) Assignees: CHINA NUCLEAR POWER ENGINEERING COMPANY LTD., Shenzhen (CN); CHINA GENERAL NUCLEAR POWER CORPORATION, Shenzhen (CN)

(*) Notice: Subject to any disclaimer, the term of this patent is extended or adjusted under 35 U.S.C. 154(b) by 270 days.

(21) Appl. No.: 15/311,034

(22) PCT Filed: Nov. 12, 2015

(86) PCT No.: PCT/CN2015/094495
§ 371 (c)(1),
(2) Date: Nov. 14, 2016

(87) PCT Pub. No.: WO2017/079949
PCT Pub. Date: May 18, 2017

(65) Prior Publication Data
US 2018/0033503 A1    Feb. 1, 2018

(51) Int. Cl.
*G21C 17/10*    (2006.01)
*G21C 13/02*    (2006.01)
(Continued)

(52) U.S. Cl.
CPC ............ *G21C 17/10* (2013.01); *G21C 13/02* (2013.01); *G21C 17/002* (2013.01);
(Continued)

(58) Field of Classification Search
CPC ...... G21C 17/00; G21C 17/045; G21C 17/10; G21C 17/104; G21C 17/108; G21C 17/002; G21C 17/007; G21C 17/01; G21C 13/02
(Continued)

(56) References Cited

U.S. PATENT DOCUMENTS 4,186,048 A * 1/1980 Thomas ............... G21C 17/108
                                                      376/254
4,588,547 A * 5/1986 Impink, Jr. .......... G21C 17/104
                                                      376/214
(Continued)

FOREIGN PATENT DOCUMENTS

CN       1292554 A       4/2001
CN     201146064 Y      11/2008
(Continued)

OTHER PUBLICATIONS

US Nuclear Regulatory Commission, Westinghouse Technology Systems Manual, Section 9.1, Excore Nuclear Instrumentation, published Nov. 20, 2011, downloaded on Sep. 22, 2019 at https://www.nrc.gov/docs/ML1122/ML11223A263.pdf (Year: 2011).*
(Continued)

*Primary Examiner* — Jack W Keith
*Assistant Examiner* — Daniel Wasil

(57) ABSTRACT

A nuclear instrumentation system includes a source range channel, an intermediate range channel, and a power range
(Continued)

channel. Each channel includes one detector installed around the pressure vessel. The detectors of the power range channel and the intermediate range channel both include several fission chambers. The detectors of the intermediate range channel and power range channel share several fission chambers. Since some detectors employ fission chambers, the Gamma radiation resistance property, anti-noise property, and anti-electromagnetic interference property are improved. Sharing fission chambers reduces the number of detectors to be installed, thus relieving the installation workload and the positioning of a follow-up detector. Further, the system increases the number of some channels, which increases redundancy and improves system reliability.

13 Claims, 5 Drawing Sheets

(51) Int. Cl.
  *G21C 17/108* (2006.01)
  *G21C 17/00* (2006.01)
  *G21C 17/007* (2006.01)
  *G21C 17/01* (2006.01)
  *G21C 17/017* (2006.01)

(52) U.S. Cl.
  CPC ........... *G21C 17/007* (2013.01); *G21C 17/01* (2013.01); *G21C 17/108* (2013.01); *G21C 17/017* (2013.01); *Y02E 30/40* (2013.01)

(58) Field of Classification Search
  USPC .......................................... 376/254
  See application file for complete search history.

(56) References Cited

U.S. PATENT DOCUMENTS

| | | | | | |
|---|---|---|---|---|---|
| 4,774,050 | A | * | 9/1988 | Impink, Jr. | G21C 17/10 376/216 |
| 5,078,957 | A | * | 1/1992 | Tower | G21C 17/10 376/245 |
| 5,249,207 | A | * | 9/1993 | Bacconnet | G21C 7/107 376/254 |
| 5,802,127 | A | * | 9/1998 | Goldberg | G21C 17/10 376/245 |
| 2013/0010915 | A1 | | 1/2013 | Garnier et al. | |
| 2015/0377756 | A1 | * | 12/2015 | Michishita | G21C 17/001 73/825 |

FOREIGN PATENT DOCUMENTS

| | | |
|---|---|---|
| CN | 103345950 A | 10/2013 |
| CN | 105448363 A | 3/2016 |

OTHER PUBLICATIONS

A machine translation of Fu et al., CN103345950 (A) downloaded from https://worldwide.espacenet.com/ on Sep. 18, 2019 (Year: 2013).*

International Search Report (ISR) issued by the State Intellectual Property Office of the Peoples Republic of China dated Jun. 12, 2016 for PCT/CN2015/094495.

* cited by examiner

NUCLEAR INSTRUMENTATION SYSTEM AND METHOD FOR LOCATING THE SAME

CROSS-REFERENCE TO RELATED APPLICATIONS

This application is a U.S. national phase application of PCT application No. PCT/CN2015/094495, filed Nov. 12, 2015, and also claims priority to Chinese Patent Application No 2015107728315, filed Nov. 12, 2015 in the State Intellectual Property Office of P.R. China, which are hereby incorporated herein in their entireties by reference.

FIELD OF THE INVENTION

The present application relates generally to a field of nuclear power system, and more particularly relates to a nuclear instrumentation system and method for locating the same.

BACKGROUND OF THE INVENTION

A nuclear instrumentation system, also known as the RPN system, employs a series of detectors distributed outside the reactor pressure vessel for measuring a reactor power, a power variation rate and a power radial and axial distribution and so on. At present, the RPN system is known to contain two source range channel detectors, two intermediate range channel detectors, and four power range channel detectors. The intermediate range channel detector consists of several compensated ionization chambers, and the power range channel detector consists of six segments of long ionization chambers. As the long ionization chambers and the compensated ionization chambers are employed, the intermediate range channel detector and the power range channel detector have a poor performance in Gamma radiation resistance property, anti-noise property and anti-electromagnetic interference property, thus having poor stability and reliability, so can not satisfy the surveilling requests of the nuclear power plant after accidents.

In additional, the source range channel and intermediate range channel have two channels which possessing a lower redundancy. Consequently, when an accident occurs, the source range channel and intermediate range channel have signals of low reliability. Further, in the traditional RPN system, the distribution in the radial direction and the axial direction is as follows. The standby channel is located at the radial positions of 0° and 180° of the reactor pressure vessel in the distribution along the radial direction, the source range channel detector and intermediate range channel detector are located at the radial positions of 90° and 270° of the reactor pressure vessel in the distribution along the radial direction, the power range channel detectors are located at the radial positions of 45°, 135°, 225° and 315° of the reactor pressure vessel in the distribution along the radial direction, respectively. In the distribution along the axial direction, the source range channel detector and intermediate range channel detector are centred in a core plane at ¼ or ½ height of the core, the power range channel detector is centred in a core plane at ½ height of the core. When locating, the cylinder bracket of the detector can not be directly installed in the measurement position due to the support ring of the pressure vessel. Referring FIG. 1, the RPN system locates the detectors via a push-pull trolley. As shown in FIG. 1, reference number 1 represents the vessel head of the pressure vessel, reference number 2 represents the cover, reference number 3 represents the cable connecting plate, reference number 4 represents the detector, reference number 5 represents the core, reference number 6 represents the measuring position, reference number 7 represents the position when the detector is pulled out, reference number 8 represents the moveable locating device. The source range channel detector and the intermediate range channel detector are installed in the same sleeve, the power range channel detector is installed in another sleeve. These sleeves enter the locating trolley via lifting channels in different angles and are fixed therein (referring the detection tube shown by dotted line in FIG. 1). Then, these sleeves are transferred to the work position along the predetermined route via the locating trolley, then the cable is connected with the cable connecting plate via an upper hole. The detectors can be lifted in and out via the upper hole for maintenance and installation. However, not only is such installation and location manner cumbersome, but also it requires large space for installation and maintenance and is inconvenient for operation and maintenance. Even in the test maintenance during refueling outage, the work staff also suffers much radioactive irradiation, and they would suffer even more when inspecting or replacing the detectors. In addition, the cable connecting plate is very close to the reactor core, so its thermal expansion and contraction is likely to result in connection loose, thus mutating or losing measuring signal of the detector.

SUMMARY OF THE INVENTION

An objective of this invention is, aimed to the disadvantage discussed above, providing a nuclear instrumentation system and method for locating the same.

According to a first aspect, a nuclear instrumentation system is provided for surveilling reactor core parameters of the pressure vessel, which including a source range channel, an intermediate range channel and a power range channel, wherein each channel includes one detector installed around the pressure vessel, the detectors of the power range channel and the intermediate range channel both include several fission chambers, all the fission chambers of the detector of the intermediate range channel share the fission chambers of the power range channel.

In the nuclear instrumentation system according to the present application, the detector of the power range channel includes four fission chambers connected in turn, wherein, the four fission chambers are homogeneously distributed at both sides of a core plane at ½ height of the core along an axial direction of the pressure vessel, the detector of the intermediate range channel shares both two middle fission chambers of the detector of the power range channel.

In the nuclear instrumentation system according to the present application, the detector of the source range channel is installed in a core plane at ¼ height of the core along an axial direction of the pressure vessel.

In the nuclear instrumentation system according to the present application, there are three source range channels, four intermediate range channels and four power range channels.

In the nuclear instrumentation system according to present application, the detectors of the intermediate range channel and the detectors of the power range channel are both installed in one instrumentation guiding sleeve, the detectors of the source range channel are installed in one instrumentation guiding sleeve independently, the detectors of the three source range channels are installed homogeneously along a circumferential direction of the pressure vessel, the detectors of the four intermediate range channels/power range channels are installed homogeneously along the circumferential direction of the pressure vessel, wherein the detectors of the source range channels and the detectors of the intermediate range channels/power range channels are staggered with each other.

In the nuclear instrumentation system according to present application, the detectors of the source range channels are distributed at radial positions of 10°, 190°, 280° of the pressure vessel, the detectors of the intermediate range channels/power range channels are distributed at radial positions of 45°, 135°, 225° and 315° of the pressure vessel.

In the nuclear instrumentation system according to present application, the instrumentation guiding sleeve with a bottom of opening structure is pre-embedded in a civil engineering structure of a reactor workshop, and the instrumentation guiding sleeve extends downward and obliquely along a wall to a position near a top of the pressure vessel, then extends vertically downward and exceeds a plane where the bottom of the pressure vessel locates.

In the nuclear instrumentation system according to present application, the nuclear instrumentation system further includes several lifting ports in a connecting box of an operating platform of the reactor workshop, each of the lifting ports is communicated with one of the instrumentation guiding sleeves which is connected with the connecting box, a top of each detector is connected with an outer lifting device.

In the nuclear instrumentation system according to present application, each of the lifting ports is installed with the cable connecting plate, a cable of the detector is connected with a protection cabinet of the nuclear instrumentation system via the cable connecting plate.

In the nuclear instrumentation system according to present application, the lifting device is a polar crane of the reactor workshop.

In the nuclear instrumentation system according to present application, the nuclear instrumentation system further includes four protection cabinets, the detectors of the four intermediate range channels/power range channels are connected with the four protection cabinets via coaxial cables, respectively, the detector of each source range channel is connected with one protection cabinet via a coaxial cable.

In the nuclear instrumentation system according to present application, the nuclear instrumentation system further includes one control cabinet connected with each protection cabinet, and further connected with an outer system.

In the nuclear instrumentation system according to present application, the nuclear instrumentation system further includes an interface system for connecting corresponding protection cabinet to following system: a reactor protection system, a rod position indicating and rod control system, a main control room, a core online surveillance system.

According to a second aspect, a method for locating a nuclear instrumentation system discussed above is provided, which including:

S1. connecting the top of each detector with the lifting device;

S2. putting each detector into corresponding lifting port after lifting each detector by the lifting device, wherein, the lifting ports are arranged in the connecting box of the operating platform of the reactor workshop, each of the lifting ports is communicated with one instrumentation guiding sleeve which is connected with the connecting box, the instrumentation guiding sleeve with a bottom of opening structure is pre-embedded in the civil engineering structure of the reactor workshop, and the instrumentation guiding sleeve extends downward and obliquely along the wall to the position near a top of the pressure vessel, then extends vertically downward and exceeds the plane where the bottom of the pressure vessel locates;

S3. controlling each detector to extend downward and obliquely along the instrumentation guiding sleeve by the lifting device until each detector reaches corresponding positions.

In the method for locating a nuclear instrumentation system, the detector of the power range channel includes four fission chambers connected in turn, the detector of the intermediate range channel shares two middle fission chambers of the detector of the power range channel, wherein, in step S3, the corresponding positions reached by each detector include:

the detector of the source range channel is installed in a core plane at ¼ height of the core along the axial direction of the pressure vessel;

the detectors of the power range channel and the intermediate range channel are along the axial direction of the pressure vessel, such that the four fission chambers are homogeneously distributed at both sides of a core plane at ½ height of the core along the axial direction of the pressure vessel.

When implementing the nuclear instrumentation system and method for locating the same according to the present application, following advantageous or effects can be obtained. As the detectors of the intermediate range channel and power range channel both are formed by several fission chambers, the Gamma radiation resistance property, anti-noise property and anti-electromagnetic interference property are improved, thus high stability and reliability are possessed, so the surveilling requests of the nuclear power plant after accidents is satisfied. Meanwhile, the detector of the intermediate range channel shares the fission chambers in the power range channel, which not only can save resources and reduce supplies, but also can reduce the number of detectors to be installed, thus relieving the workload of the installation and positioning of the follow-up detector, and reducing the space required for the installation of detectors.

Further, the present application increases the number of some channels, which increases the redundancy, improves system reliability. Especially for the middle range channel, the present application improves redundancy, and substantially reduces the number of the general detector at the same time. In addition, the invention adopts a "bucket installation", which guides and installs the detector via the instrumentation guiding sleeve, while lifting the detector along the instrumentation guiding sleeve from the lifting port. The lifting port is arranged on the operation platform of the reactor workshop, so the installation and lifting require only compact structure, facilitate operation and maintenance, and prevent the work staff from suffering high irradiation, comparing with the push-pull trolley. In addition, as the cable connecting plate is installed on lifting port arranged on the operation platform and far away from the reactor core, so that the transmission signal is not subject to disturbance and influence of the core environment.

BRIEF DESCRIPTION OF THE DRAWINGS

The present application is further illustrated combining the embodiments of present application and the attached drawings.

DETAILED DESCRIPTION OF THE PREFERRED EMBODIMENTS

Hereinafter, embodiments of the present invention will be described in detail with reference to the accompanying drawings.

Figure 1:
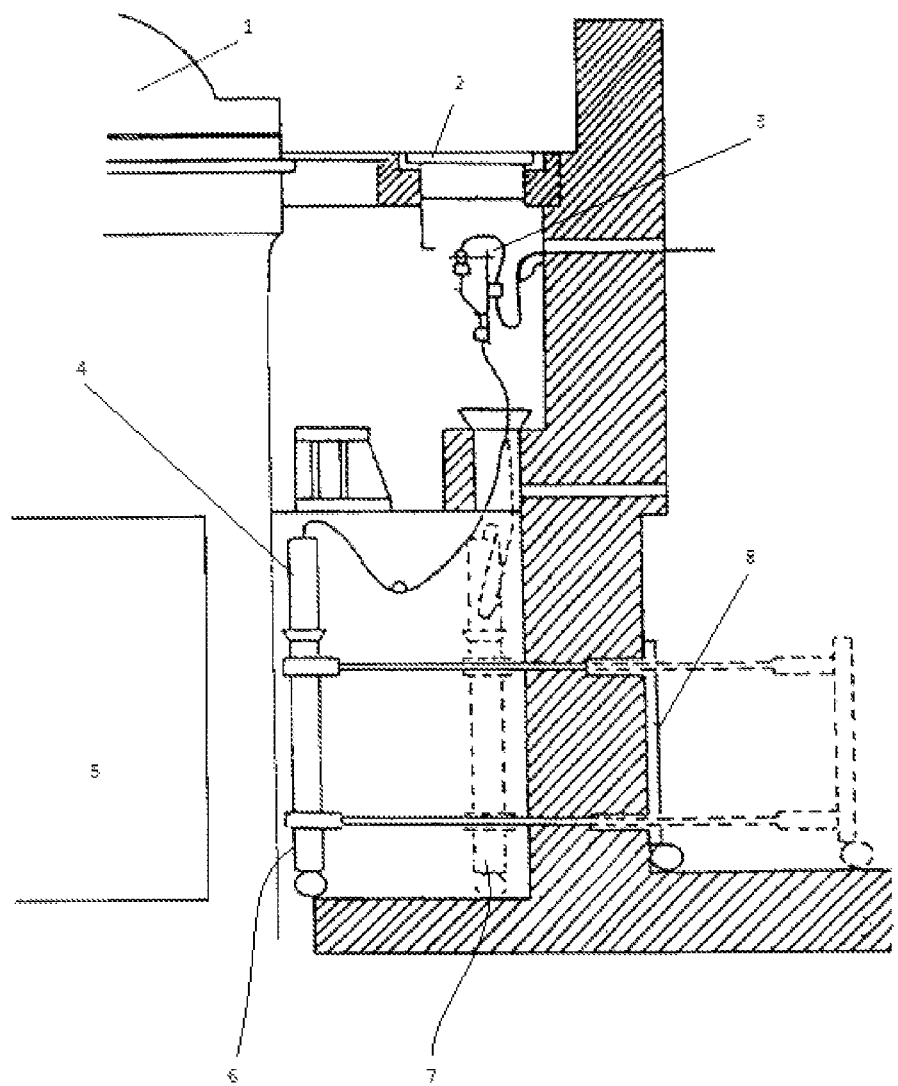
FIG. 1 is a schematic diagram showing the locating of the detector in the traditional nuclear instrumentation system.
Figure 2:
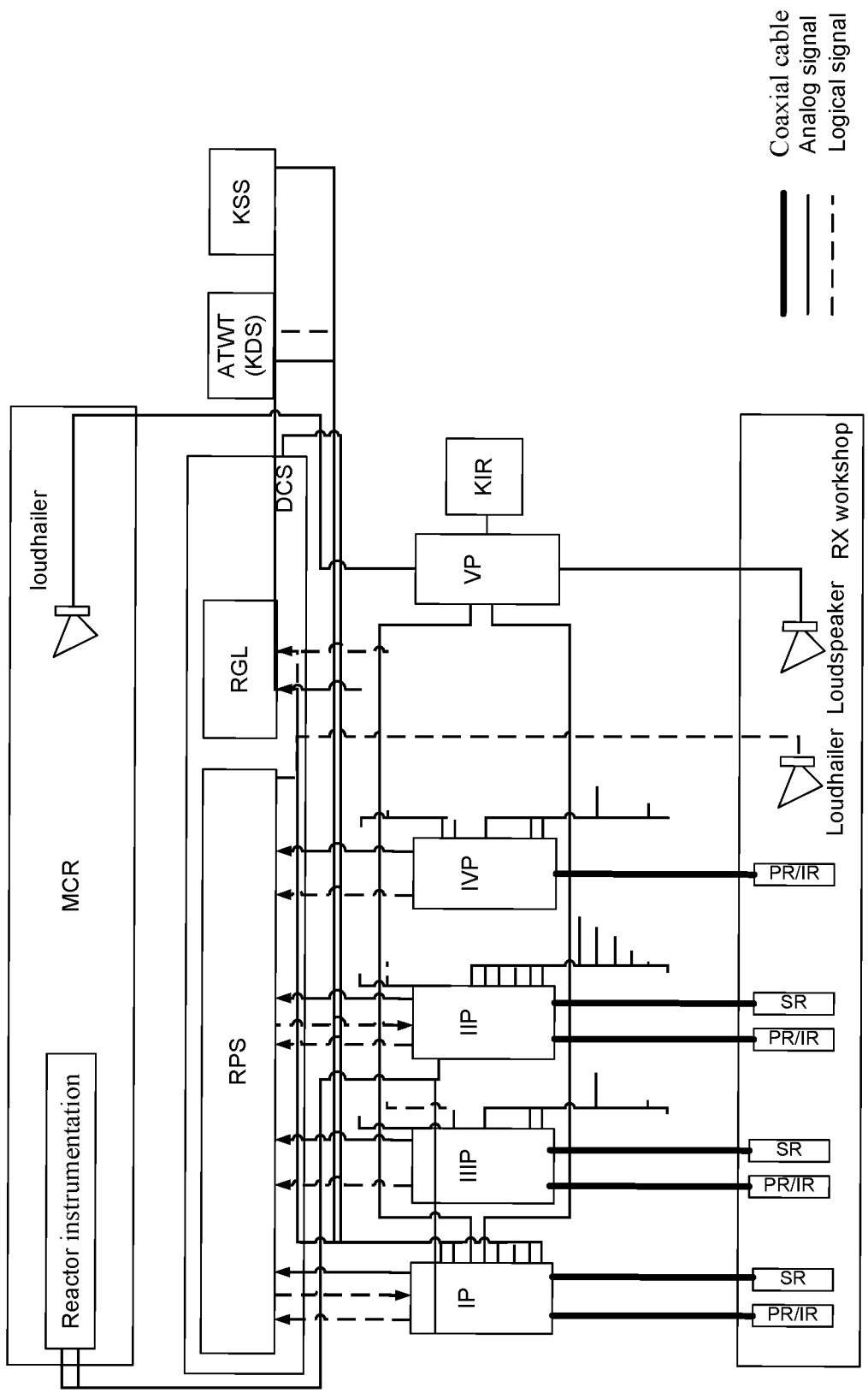
FIG. 2 is a structure diagram of the nuclear instrumentation system according to the present application.

FIG. 2 is a structure diagram of the nuclear instrumentation system according to the present application.

A nuclear instrumentation system is mainly used to surveille the reactor core parameters of the pressure vessel, such as the reactor power, power change rate and the power radial and axial distribution and so on. The pressure vessel is placed in the workshop, and the nuclear instrumentation system includes three channels for obtaining surveilling signals, a protection cabinet for power surveilling of the signals of the three channels, and a control cabinet for implementing surveilling of the sound count rate, alarming and other control functions.

Three channels, that is source range channel (SR), intermediate range channel (IR), power range channel (PR), each includes a corresponding detector. All the detectors of the nuclear instrumentation system are distributed around the reactor pressure vessel. SR provides emergency shutdown protection function with a main purpose of preventing the consequences resulted by the subcritical rod withdrawing accident, boron dilution accident and rod ejection accident. IR is also a super power protection provided by the core startup and low power phase to prevent the consequences resulted by the subcritical rod withdraw accident and rod ejection accident. PR provides a super power protection which can cover the operation range of the reactor core approaching the critical level to the full power, and its emergency shutdown protection mainly prevents the consequences resulted by the rod withdraw accident, boron dilution accident and rod ejection accident and so on which are occurred during the power operation. The super power protection provided by PR has a certain overlapped range with the super power protection provided by IR at the core startup and low power phase, which provides a redundancy super power protection during the core startup and low power phase.

The IR and PR detectors are improved in present application. The IR and PR detectors all include several fission ionization chambers, which are referred to as fission chamber. The IR and PR detectors share a number of fission chambers. Preferably, all fission chambers of the IR detector share the fission chambers in PR. Since each fission chamber has two output ends, it can be shared through connecting corresponding output ends. In the specific embodiment, the PR detector includes four fission chambers connected in turn.

Figure 3:
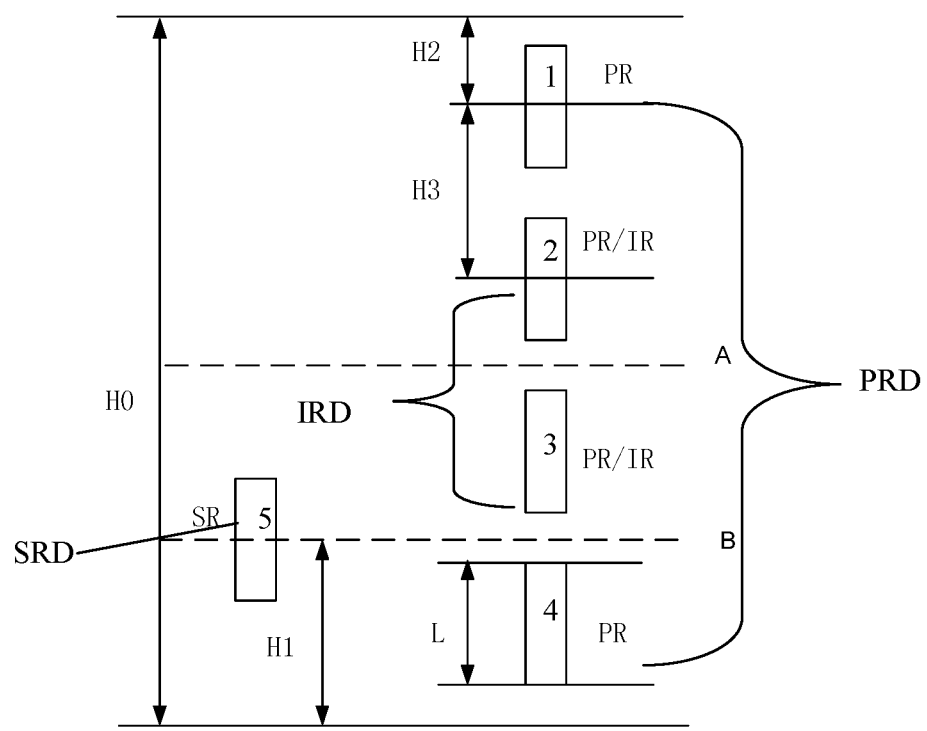
FIG. 3 is a schematic diagram showing the axial distribution of the detector in the nuclear instrumentation system according to the present application.

FIG. 3 is a schematic diagram showing the axial distribution of the detector in the nuclear instrumentation system according to the present application.

In the FIG. 3, the dotted line A represents a plane at ½ height of the core, the dotted line B represents a plane at ¼ height of the core, the four strip frames at right represent four fission chambers 1-4 arranged from up to down, the strip frame 5 at left represents the SR detector SRD, which is similar as the prior art and realized based on boron-lined proportional counter.

The four fission chambers 1-4 are homogeneously distributed at both sides of a core plane at ½ height of the core along an axial direction of the pressure vessel. As the fission chambers 2-3 are close to the core, the IR detector IRD shares the fission chambers 2-3 of the PR detector PRD.

The SR detectors SRD mainly detect parameters related to core starting, so they are arranged in a core plane at ¼ height of the core along an axial direction of the pressure vessel, corresponding to the position of the primary neutron source.

For example, in the specific embodiment in FIG. 3, H0 which representing the core activity height, is 365.76 cm, H1 which representing the height of the ¼ core plane, is 91.44 cm, H2 which representing the distance from the fission chamber 1 to the core top, is 50.73 cm, H3 which representing the distance between the middles of the sensitive segments of two fission chambers, is 88.1 cm. L which representing the length of each fission chamber, is 23.5 cm. It can be understood that the specific values of the height, length are set according to the actual situation, but not limited.

As the IR and PR detectors are formed by fission chambers which have advantages of long life (up to 40 years), high Gamma radiation resistance property, fine anti-noise property, good anti-electromagnetic interference property, better stability, higher reliability, easy maintenance and no need to remove high voltage of the detector, so the surveilling requests of the nuclear power plant after accidents can be satisfied. Meanwhile, as IR and PR share the fission chambers, the IR and PR detectors are installed in one instrumentation guiding sleeve when installing, the SR detector is installed in one instrumentation guiding sleeve independently, thus relieving the workload of the installation and positioning of the follow-up detector, and reducing the space required for the installation.

Figure 4:
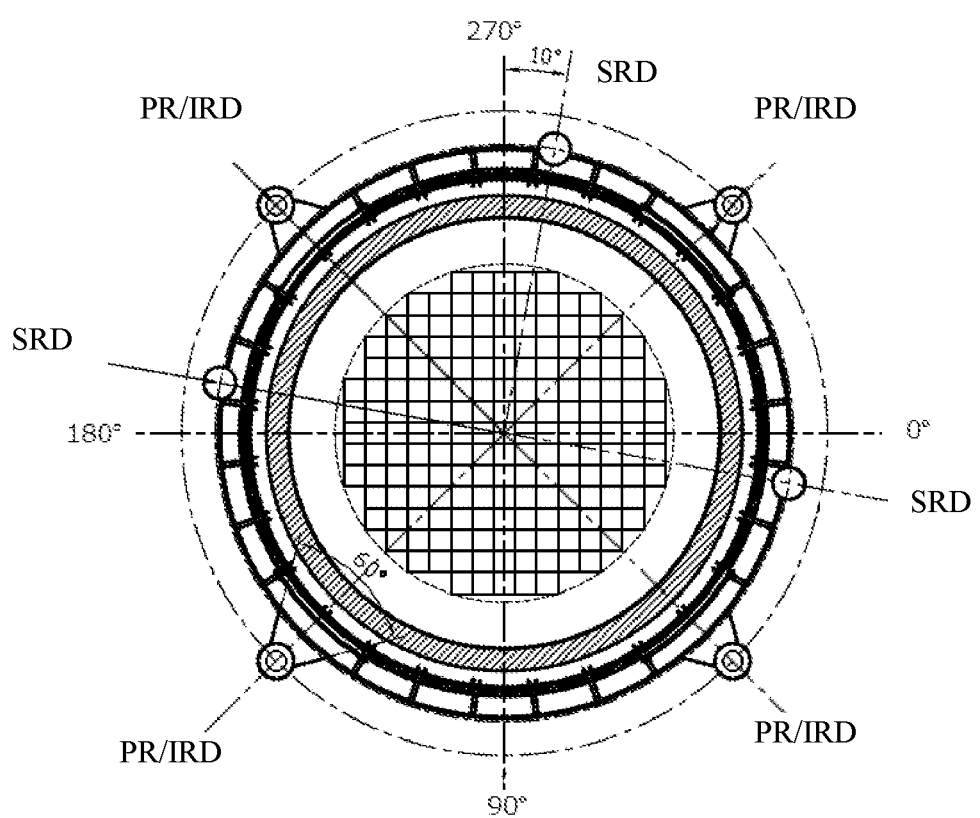
FIG. 4 is a schematic diagram showing the radial distribution of the detector in the nuclear instrumentation system according to the present application.

FIG. 4 shows the overlooking effect of the container positioning. The radial 0° is set after positioning the pressure vessel according to the workshop situation, which belongs to prior art and not repeated herein.

In the radial distribution, the detectors SRD of the three source range channels are installed homogeneously along a circumferential direction of the pressure vessel, the detectors PR/IRD of the four intermediate range channels/power range channels are installed homogeneously along the circumferential direction of the pressure vessel, wherein the detectors of the source range channels and the detectors of the intermediate range channels/power range channels are staggered with each other.

Normally, the detectors of the source range channels are distributed at positions of 0°, 90°, 180° and 270°. However, when considering the actual situation, the present application has 10° deflection. To be specific, the SR detectors are distributed at radial positions of 10°, 190°, 280° of the pressure vessel. The IR/PR detectors are arranged at the diagonal of the core according to the traditional scheme, which are radial positions of 45°, 135°, 225° and 315° of the pressure vessel.

Figure 5:
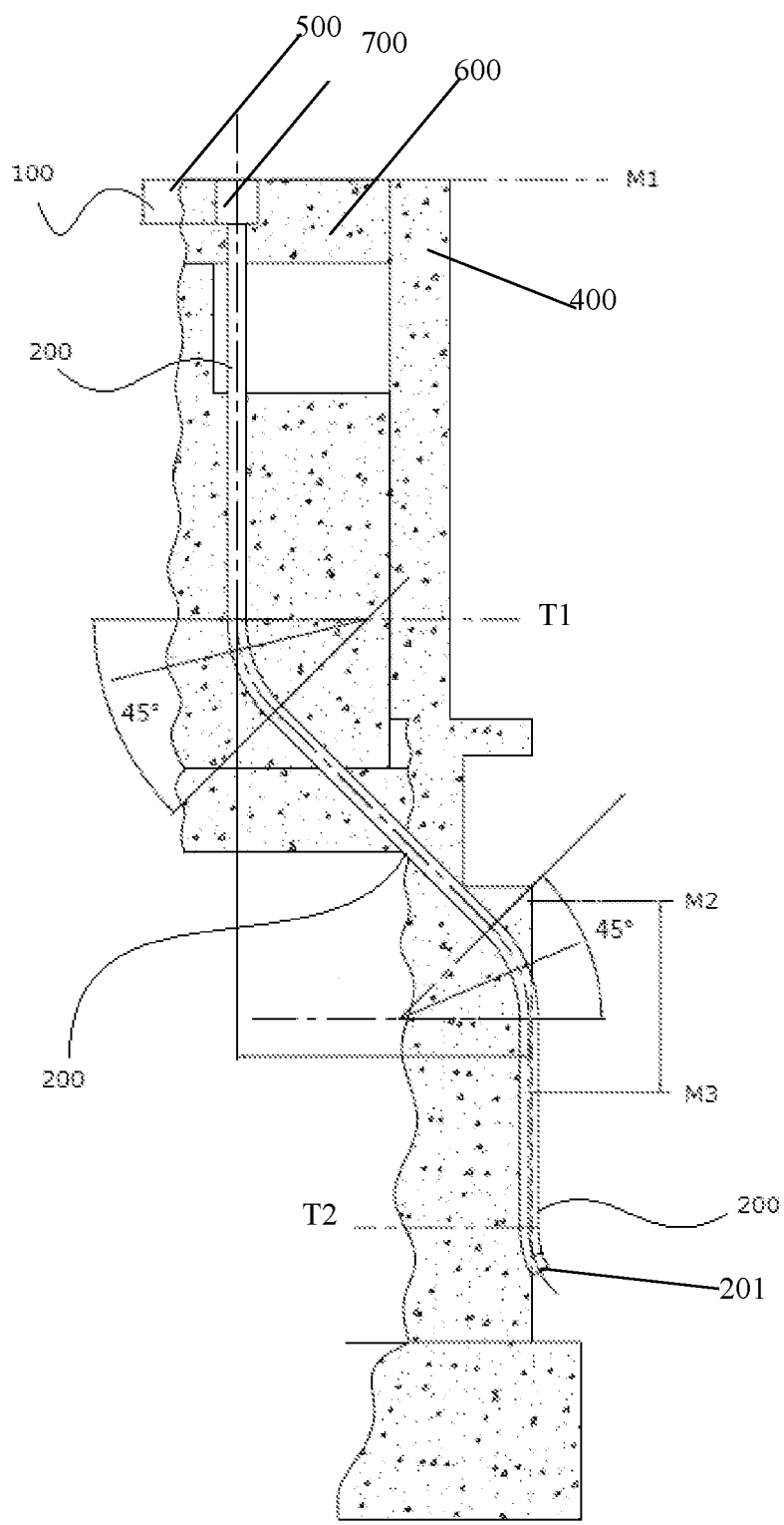
FIG. 5 is a schematic diagram showing the locating of the detector in the nuclear instrumentation system according to the present application.

FIG. 5 is a schematic diagram showing the locating of the detector in the nuclear instrumentation system according to the present application. The snow filling area in the figure represents the wall of the workshop. M1 represents the height position where the operating platform of the reactor workshop locating, the region between the M2 and M3 represents the reactor core activity section, corresponding to the H1 in FIG. 3 above.

The instrumentation guiding sleeve 200 with a bottom 201 of opening structure is pre-embedded in a civil engineering structure 400 of a reactor workshop, so as to cope with possible operation error and dirt removal.

Several lifting ports 100 are arranged in a connecting box 500 of an operating platform of the reactor workshop 600. The number of the lifting ports 100 is the same as that of the detectors 700. Each of the lifting ports 100 is communicated with one of the instrumentation guiding sleeves 200 which is connected with the connecting box via a flange, that is, one detector is installed by each lifting port 100. The instrumentation guiding sleeves 200 can be made of rigid materials.

The lifting port 100 can be arranged at a position far away from the pressure vessel along the radial direction. The instrumentation guiding sleeve 200 extends from the lifting port 100 downward. It firstly extends vertically downward, and then obliquely downward to a position T1 near a top of the pressure vessel, and then extends vertically downward along the wall and finally exceeds a plane T2 where the bottom of the pressure vessel locates.

A top of each detector is connected with an outer lifting device, such as a polar crane of the reactor workshop. When installing the detector, the lifting device puts the detector in aligning the lifting port 100, and then inserts the detector into the instrumentation guiding sleeve 200 and fixes it at the position corresponding to the pressure vessel. If the detector should be changed or maintained, the lifting device pulls the detector upward along the instrumentation guiding sleeve 200, and then pulls the detector out through the lifting port 100.

The invention adopts a "bucket installation", which guides and installs the detector via the instrumentation guiding sleeve, while lifting the detector along the instrumentation guiding sleeve from the lifting port. The lifting port is arranged on the operation platform of the reactor workshop, so the installation and lifting require only compact structure, facilitate operation and maintenance, and prevent the work staff from suffering high irradiation, comparing with the push-pull trolley.

Furthermore, each of the lifting ports 100 is installed with the cable connecting plate (unshown), a cable of the detector is connected with a protection cabinet of the nuclear instrumentation system via the cable connecting plate.

As the cable connecting plate is installed on lifting port arranged on the operation platform and far away from the reactor core, so that the transmission signal is not subject to disturbance and influence of the core environment. Accordingly, the influence of thermal expansion and contraction in prior art never presents, which make the micro-signal (10-11 A) of the detector more stable, and would not be inclined to mutate or loss the measuring signals of the detector, thus avoiding the signal instability and the flash of weak signals.

Referring FIG. 2 again, when considering improving the system reliability, there are three SR, four IR and four PR.

Comparing with the prior art, the numbers of SR and IR have be increased, which realizing redundant, improving system reliability. Especially for the IR, as it shares the fission chamber of PR, the overall number of detectors has been reduced while improving the redundant.

In FIG. 2, IP-IVP represent four protection cabinets with device numbers RPN1101AR, RPN1201AR, RPN1301AR, RPN1401AR, VP represent control cabinets with device numbers RPN2101AR, RPN1101AR, RPN1201AR, RPN1301AR, RPN1401AR, RPN2101AR. Four IR/PR detectors are connected with the four protection cabinets IP-IVP via coaxial cables, respectively. Three SR detectors are connected with the protection cabinets IP-IIIP via coaxial cables, respectively, and are connected with outer systems via audio counting signal and neutron noise signal output channel.

Furthermore, the nuclear instrumentation system further includes an interface system for connecting corresponding protection cabinet to following systems connected with other systems of the nuclear power plant: a reactor protection system (RPS), a rod position indicating and rod control system (RGL), a main control room (MCR), a core online surveillance system (KS S), loose parts and vibration surveilling system (KIR).

The RPS is used for processing core jumping signal or core jumping blocking signal sent by the nuclear instrument system, processing the signals from the power range channel, determining the axial power deviation DPax, and calculating the reactor emergency shutdown setting value at super power $\Delta T$ and overtemperature $\Delta T$. RGL is used for outputting the locking logic and prohibition signal of the automatic and manual rod withdrawing. A maximum power analog signal is generated by a high selection unit from the power signals from the four power range channels, and inputted into the RGL system for processing. MCR is used for displaying the measurement results of nuclear instrumentation system, surveilling the core operating mode, displaying the corresponding alarm, storing the historical operation parameter of the reactor core, etc. KSS is used for displaying the measuring results and processed signals of the nuclear instrumentation system, surveilling the core operating mode, generating corresponding alarm, and storing the historical operation parameter of the reactor core, etc. KIR is used for receiving the neutron level and neutron noise signal from the power range channel.

Correspondingly, a method for locating a nuclear instrumentation system discussed above is provided in present application, which including following steps.

S1. The top of each detector is connected with the lifting device outside the workshop.

S2. Each detector is put into corresponding lifting port after being lifted by the lifting device, wherein, the lifting ports are arranged in the connecting box of the operating platform of the reactor workshop. Each of the lifting ports is communicated with one instrumentation guiding sleeve which is connected with the connecting box via a flange. The instrumentation guiding sleeve with a bottom of opening structure is pre-embedded in the civil engineering structure of the reactor workshop, and the instrumentation guiding sleeve extends downward and obliquely along the wall to the position near a top of the pressure vessel, then extends vertically downward and exceeds the plane where the bottom of the pressure vessel locates;

S3. Each detector is controlled to extend downward and obliquely along the instrumentation guiding sleeve by the lifting device until each detector reaches corresponding positions.

Wherein, the corresponding position includes following arrangement.

For SR detector, the corresponding position is arranged in a core plane at ¼ height of the core along an axial direction of the pressure vessel.

For PR and IR detectors, the corresponding positions are arranged along an axial direction of the pressure vessel such that the four fission chambers are homogeneously distributed at both sides of a core plane at ½ height of the core along an axial direction of the pressure vessel.

When the detector should be taken out, the lifting device pulls the detector upward along the instrumentation guiding sleeve 200, and then pulls the detector out through the lifting port 100.

When implementing the nuclear instrumentation system and method for locating the same according to the present application, following advantageous or effects can be obtained. As the detectors of the intermediate range channel and power range channel both are formed by several fission chambers, the Gamma radiation resistance property, anti-noise property and anti-electromagnetic interference property are improved, thus high stability and reliability are possessed, so the surveilling requests of the nuclear power plant after accidents is satisfied. Meanwhile, the detector of the intermediate range channel shares the fission chambers in the power range channel, which not only can save resources and reduce supplies, but also can reduce the number of detectors to be installed, thus relieving the workload of the installation and positioning of the follow-up detector, and reducing the space required for the installation of detectors. Further, the present application increases the number of some channels, which increases the redundancy, improves system reliability. Especially for the middle range channel, the present application improves redundancy, and substantially reduces the number of the general detector at the same time. In addition, the invention adopts a "bucket installation", which guides and installs the detector via the instrumentation guiding sleeve, while lifting the detector along the instrumentation guiding sleeve from the lifting port. The lifting port is arranged on the operation platform of the reactor workshop, so the installation and lifting require only compact structure, facilitate operation and maintenance, and prevent the work staff from suffering high irradiation, comparing with the push-pull trolley. In addition, as the cable connecting plate is installed on lifting port arranged on the operation platform and far away from the reactor core, so that the transmission signal is not subject to disturbance and influence of the core environment.

The foregoing description of the embodiment of the present application has been presented for purpose of illustration and description. It is intended to illustrate the present application rather than limit the application to the precise form disclosed. It should be understood that various changes, substitutions and alterations can be made hereto by one skilled in the art based on the motivation of the present application, without departing from the spirit and scope of the present application as described by the appended claims.

What claimed is:

1. A nuclear instrumentation system for surveilling reactor core parameters of the pressure vessel, including a source range channel, an intermediate range channel and a power range channel, wherein each channel includes one detector installed around the pressure vessel, wherein the detector of the power range channel includes at least one fission chamber and the detector of the intermediate range channel includes at least one fission chamber; wherein the detector of the power range channel and the detector of the intermediate range channel share at least one fission chamber.

2. The nuclear instrumentation system according to claim 1, wherein the detector of the power range channel includes four fission chambers connected sequentially, wherein, the four fission chambers are distributed with a same distance at both sides of a core plane at ½ height outside of the core along an axial direction of the pressure vessel, the detector of the intermediate range channel shares both two middle fission chambers of the detector of the power range channel; wherein two fission chambers are arranged at upside of the core plane while two fission chambers are arranged at downside of the core plane.

3. The nuclear instrumentation system according to claim 1, wherein the detector of the source range channel is installed in a core plane at ¼ height of the core along an axial direction of the pressure vessel.

4. The nuclear instrumentation system according to claim 1, wherein there are three source range channels, four intermediate range channels and four power range channels.

5. The nuclear instrumentation system according to claim 4, wherein the detectors of the four intermediate range channels and the detectors of the four power range channels are both installed in one first instrumentation guiding sleeve, the detectors of the three source range channels are installed in one second instrumentation guiding sleeve independently, the detectors of the three source range channels are installed with a same distance along a circumferential direction of the pressure vessel, the detectors of the four intermediate range channels and four power range channels are installed with a same distance along the circumferential direction of the pressure vessel, wherein the detectors of the three source range channels and the detectors of the four intermediate range channels and four power range channels are offset with each other.

6. The nuclear instrumentation system according to claim 5, wherein the detectors of the three source range channels are distributed at radial positions of 10°, 190°, 280° of the pressure vessel the detectors of the four intermediate range channels and four power range channels are distributed at radial positions of 45°, 135°, 225° and 315° of the pressure vessel.

7. The nuclear instrumentation system according to claim 5, wherein the first instrumentation guiding sleeve and the second instrumentation guiding sleeve are an instrumentation guiding sleeve with a bottom of opening structure is pre-embedded in a civil engineering structure of a reactor workshop, and the instrumentation guiding sleeve extends downward and obliquely along a wall to a position near a top of the pressure vessel, then extends vertically downward and exceeds a plane where a bottom of the pressure vessel locates.

8. The nuclear instrumentation system according to claim 5, wherein the nuclear instrumentation system further includes at least one lifting port in a connecting box of an operating platform of the reactor workshop, each lifting port is corresponding connected with one of the first instrumentation guiding sleeve and the second instrumentation guiding sleeve; wherein the first instrumentation guiding sleeve and the second instrumentation guiding sleeve are connected with the connecting box, and each detector in each channel is connected with an outer lifting device.

9. The nuclear instrumentation system according to claim 8, wherein each lifting port is installed with a cable connecting plate, a cable of the each detector in each channel is connected with a protection cabinet of the nuclear instrumentation system via the cable connecting plate.

10. The nuclear instrumentation system according to claim 8, wherein the outer lifting device is a polar crane of the reactor workshop.

11. The nuclear instrumentation system according to claim 5, wherein the nuclear instrumentation system further includes four protection cabinets, the detectors of the four intermediate range channels and four power range channels are connected with the four protection cabinets via coaxial cables, respectively, each of the detectors of the three source range channels is connected with one protection cabinet via a coaxial cable.

12. The nuclear instrumentation system according to claim 11, wherein the nuclear instrumentation system further includes one control cabinet connected with each protection cabinet.

13. The nuclear instrumentation system according to claim 11, wherein the nuclear instrumentation system further includes an interface system for connecting the four protection cabinet to following systems: a reactor protection system, a rod position indicating and rod control system, a main control room, and a core online surveillance system.

* * * * *